June 19, 1951 — J. H. GEISSE — 2,557,274
CROSS WIND UNDERCARRIAGES FOR AIRPLANES
Filed Nov. 5, 1948 — 2 Sheets-Sheet 1

INVENTOR.
John Harlin Geisse

June 19, 1951 J. H. GEISSE 2,557,274
CROSS WIND UNDERCARRIAGES FOR AIRPLANES
Filed Nov. 5, 1948 2 Sheets-Sheet 2
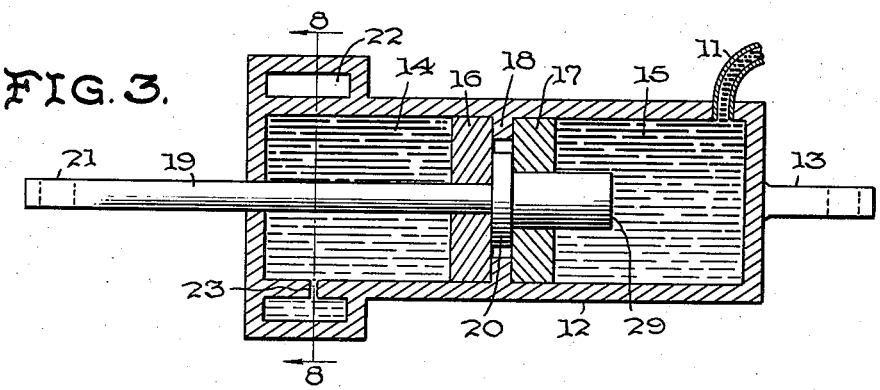
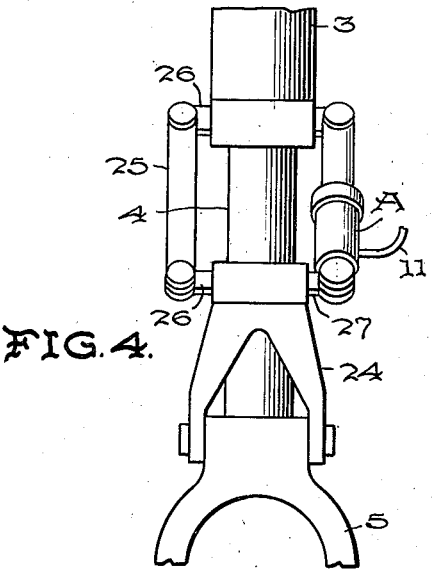
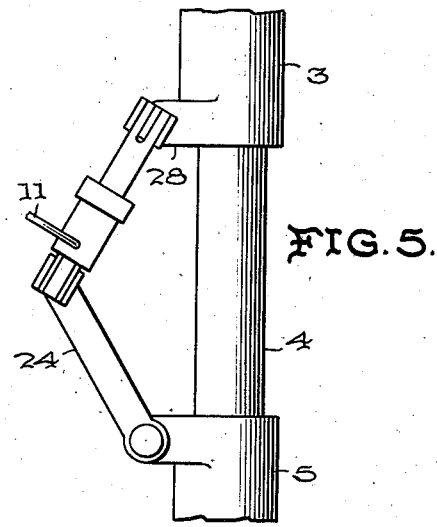
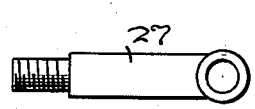
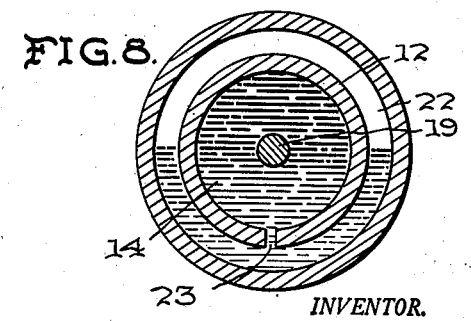
INVENTOR.
John Hakin Geisse Patented June 19, 1951

2,557,274

UNITED STATES PATENT OFFICE 2,557,274

CROSS WIND UNDERCARRIAGE FOR AIRPLANES

John Harlin Geisse, Washington, D. C.

Application November 5, 1948, Serial No. 58,427

4 Claims. (Cl. 244—103)

1

My invention relates to improvements in cross wind undercarriages for airplanes and more particularly to caster restraining means for such undercarriages.

The object of my invention is to improve the taxiing characteristics of airplanes equipped with cross wind undercarriages using castered main wheels without impairing their cross wind landing characteristics.

Another object of my invention is to provide a caster restraining mechanism whose characteristics may readily be adjusted in the initial design to compensate for the castering moments imposed by the various types of castering mechanism.

Other objects and advantages of the present invention will become apparent to one versed in the art after reading the following specification and the attached drawings forming a part thereof.

In the drawings:

Figure 3 is a sectional view of the hydraulic pumps which constitute the caster restraining elements A and A' of Figures 1, 2, 4 and 5.

Figure 8 is a section taken vertically through the annular chamber 22 of Figure 3.

Fig. 4 is a front elevation and Fig. 5 a side elevation of a second embodiment of my invention and Figs. 6 and 7 show details of construction used in Fig. 4.

Figure 1:
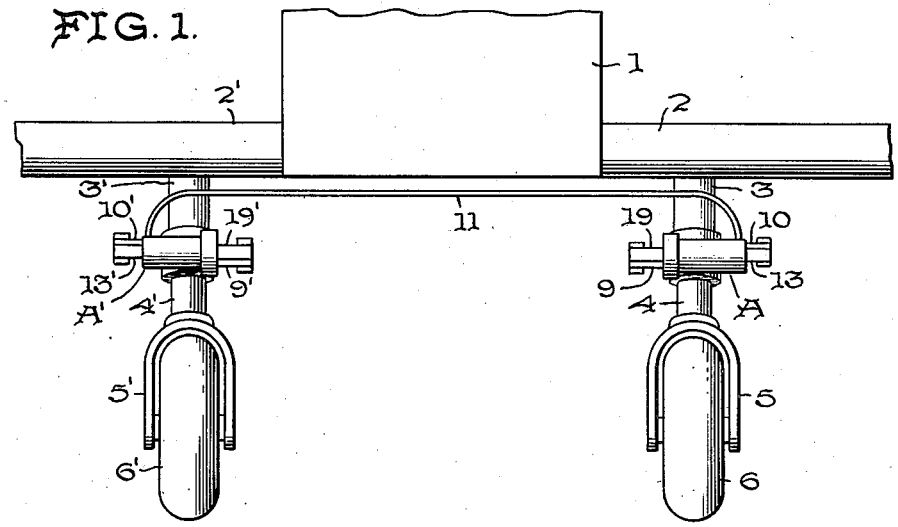
Fig. 1 is a front elevation and Fig. 2 is a side elevation showing one application of my invention to an airplane.
Figure 2:
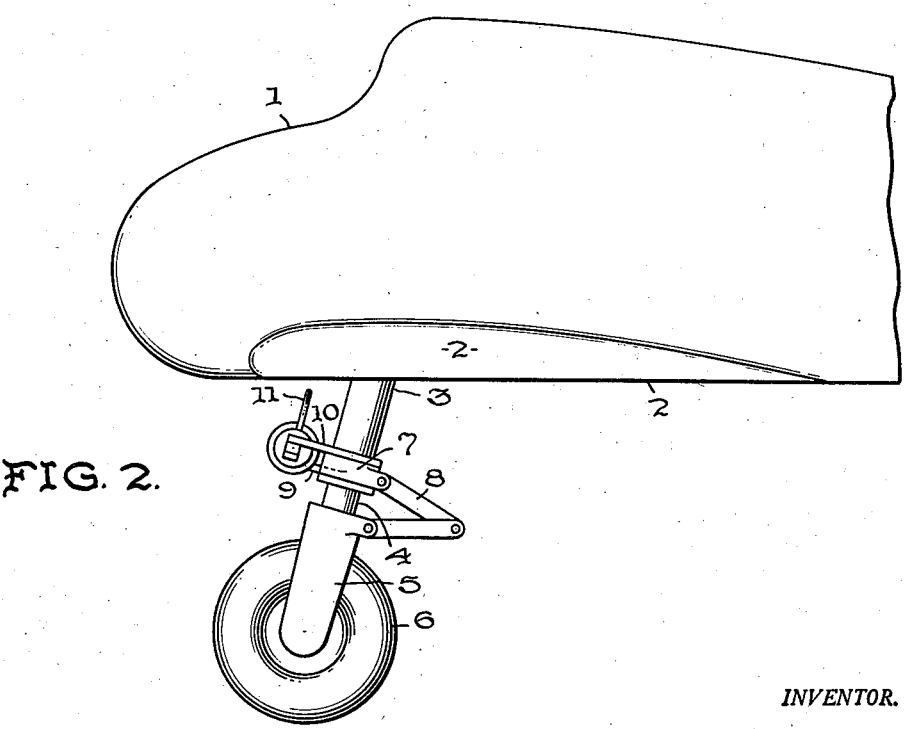

In Figs. 1 and 2, I represents the fuselage of an airplane to which the wings 2 and 2' are attached. Attached to the wings are the upper members 3 and 3' of telescopic shock struts in which the lower members 4 and 4' are reciprocatable and rotatable. Wheel forks 5 and 5' are attached to the lower strut members and carry the landing wheels 6 and 6'.

In Fig. 2, 7 is a collar rotatably mounted on the lower end of the upper strut member 3 and is constrained to rotate with the fork 5 by the jackknife 8.

Collar 7 has an arm 9 extending therefrom and an arm 10 extends from the upper strut member 3. Mounted between the extremities of arms 9 and 10 and pivotally connected thereto is the caster restraining element A.

As shown in Fig. 1, elements A and A' are interconnected by the tube 11.

In Fig. 3, 12 is the cylinder of element A and is provided with a lug 13 for pivotable attachment to arm 10. Cylinder 12 is divided into two

2 non-communicating chambers 14 and 15 by pistons 16 and 17. Pistons 16 and 17 are limited in their inward travel by the flange 18 formed with the cylinder 12. A piston rod 19 passes through and is slideable in both pistons and is provided with a collar 20 which operatively engages either piston 16 or piston 17 depending upon the position of the piston rod. Piston rod 19 has a hole 21 for pivotable connection to arm 9. Tube 11 provides communication between chamber 15 of element A and chamber 15 of element A'. Surrounding cylinder 12 at one end is a chamber 22 which communicates with chamber 14 through the orifice 23.

Chambers 14 and 15 are completely filled with a suitable liquid. Chamber 22 and tube 11 are partially filled with liquid and partially with air under pressure.

In Figs. 4 and 5, 3 is the upper part of a telescopic strut and 4 is the lower part reciprocatable and rotatable in the upper part. Wheel fork 5 is attached to the lower end of part 4 and has pivotably connected to it a conventional jackknife link 24. The upper link of the jackknife is made up of the rigid member 25 and an element A, heretofore described. Member 25 is pivotably attached at opposite ends to parts 26 and element A is pivotably attached at opposite ends to parts 27. Parts 26 and 27, shown in detail in Figs. 6 and 7, are rotatably engaged in the boss 28 attached to strut member 3 and in the end of link 24 and are held in place by being lightly threaded together in a manner permitting the rotation of one relative to the other.

In the embodiment of my invention as shown in Figures 1, 2 and 3, it will be apparent that the toeing in of either wheel will result in drawing the piston rod 19 out of the cylinder 12, i. e. a movement to the left in Figure 3. This will force fluid out of chamber 14 through orifice 23 into chamber 22 and thus increase the air pressure in chamber 22. On the other hand, toeing out of the wheel, causing the piston rod 19 to move to the right, will have no effect on the volume of chamber 14. Considering now only chamber 14 it will be apparent that the fluid therein has no effect upon the toeing out of the wheel but that it will oppose toeing in with a force which is proportional to the area of piston 16 and air pressure in chamber 22 and that the latter is a function of the original pressure and volume of the air in chamber 22 and the displacement of piston 16. It will also be apparent that any oscillatory movement of the wheel while it is in a toed in position will be damped by the resistance to fluid flow through orifice 23.

Two displacement pistons, 29 and 17 are used in chamber 15. Piston 29 operates both during toeing in and toeing out of its associated wheel. Since the chambers 15 of the left and right caster restraining elements are interconnected by the tube 11, the castering of either wheel in either direction effects the caster restraint of the other wheel by the functioning of piston 29. In contrast, piston 17 displaces liquid from chamber 15 only when the piston rod 19 moves to the right in Figure 3, corresponding, in this embodiment, to a toeing out of its associated wheel. Damping of any oscillatory movement when the wheel is in the toed out position can be provided by proper choice of the diameter of tube 11.

It will be apparent in this application of my invention that the restraint against toe in can be increased without effecting the restraint against toe out by increasing the pressures in chambers 22. The advantage of having a toe in restraint exceeding the toe out restraint is fully recited in my copending application now Patent No. 2,529,932, issued November 14, 1950. "An additional advantage of my construction apparent in this application thereof is that the restraint against simultaneous toeing out of both wheels is greater that the restraint against toe out in a normal cross wind landing in which the upwind wheel would be toed in. In the former case the pressure in the tube 11 and the chambers 15 would be increased by the displacements of the pistons 29 and 17 of both caster restraints. In the latter case the piston 17 associated with the wheel toeing in would not be displaced and its associated piston 29 would be displaced outwardly thus reducing the pressure in the chambers 15 and tube 11."

From the foregoing it will be apparent to one skilled in the art that with my construction the caster restraining element can be designed by proper choice of the independent variables of initial pressure and volume of the air in chambers 22 and tube 11 and the ratios of the areas of the three pistons, 16, 17, and 29 to determine independently:

(a) Initial toe out restraint
(b) Initial toe in restraint
(c) Rate of increase of toe out restraint
(d) Rate of increase of toe in restraint
(e) The effect of the castering of one wheel on the caster restraint of the other.

The advantages of having these independent controls will be apparent to anyone skilled in the art who attempts to design a cross wind undercarriage. In most undercarriages using castered wheels there are a number of turning moments applied to the wheels other than those due to side loads on the tires and to caster restraints. These include those due to the weight of the airplane supported by the wheel, the application of wheel brakes, and the surmounting of ground obstructions. As these vary through wide limits both as to initial magnitude and to changes in magnitude with degree of castering depending on the slope of the caster axis and the location of the wheel relative to the centerline of this axis and since it is desirable to be able to predetermine the amount of the tire side load for given degrees of caster angle each side of center, it will be found that the degree of freedom in adjustment of the caster restraints provided in my design is highly advantageous.

It will be apparent to one skilled in the art that the caster restraints could be used in the reverse position to that shown in the embodiment, i. e. the piston rod 19 could be made to move out of cylinder 12 when its associated wheel toes out instead of in and that this reversal would extend the range of adjustment beyond that possible without such reversal.

It will also be apparent to one skilled in the art that types of caster mechanism which could not otherwise be used can be used when provision is made for opposing the inward or outward castering moments of one wheel with corresponding moments of the other wheel as is possible with my design.

It should be noted that the use of liquid in the caster restraints does not of itself effect the amount of restraint and could be dispensed with if not required for damping oscillations of the wheels. Also it should be apparent that the chambers 14 could be eliminated if the caster mechanism were such that either toe in or toe out restraint is inherent in the design and does not require any addition thereto.

Having thus described my invention what I claim is:

1. A cross wind undercarriage for airplanes including laterally spaced main wheels, a caster mounting and a caster restraining element for each of said wheels, each of said caster restraining elements including a pump cylinder, two pistons reciprocatable in said cylinder, means whereby one of said pistons in each of said cylinders is actuated by the castering of its associated wheel in one direction away from its central position and whereby the other of said pistons in each of said cylinders is actuated by the castering of said wheel in both directions from its central position, and an hydraulic interconnection between the cylinders of said caster restraining elements.

2. An airplane cross wind undercarriage as described in claim 1 in combination with an additional caster restraining element for each of said wheels each including a pump cylinder and a piston reciprocatable in said cylinder, said means being so disposed in relation to said additional caster restraining element as to cause the pistons of said additional restraining elements to be displaced by the castering of their respective associated wheels in a direction opposite to said one direction.

3. An airplane cross wind undercarriage as described in claim 2 in combination with an air chamber for each said additional caster restraining elements communicating therewith through a restricted orifice.

4. A cross wind undercarriage for airplanes including laterally spaced main wheels, caster mountings for said wheels, caster restraining elements mounted adjacent to each of said wheels, a pump cylinder in each of said caster restraining elements, a first and second displacement chamber in each of said pump cylinders and at opposite ends thereof, a first, second and third piston in each of said cylinders, the first piston in each of said cylinders being reciprocatable in the said first displacement chamber thereof, the second and third pistons in each of said cylinders being reciprocatable in the said second chamber thereof, means arranged to actuate the said first piston in each of said cylinders by the castering of its adjacent wheel in one direction away from its straight ahead position, to actuate the said second piston in each of said cylinders by the castering of said adjacent wheel in the opposite direction from its straight ahead position, and to actuate said third piston in each of said cylinders by the castering of said adjacent wheel in both directions away from its straight ahead position, and an hydraulic interconnection between the said second chambers of said caster restraining elements.

JOHN HARLIN GEISSE.

REFERENCES CITED

The following references are of record in the file of this patent:

UNITED STATES PATENTS

| Number | Name | Date |
| --- | --- | --- |
| 2,345,405 | Maclaren | Mar. 28, 1944 |
| 2,474,630 | Jamison | June 28, 1948 |

FOREIGN PATENTS

| Number | Country | Date |
| --- | --- | --- |
| 695 | Great Britain | of 1914 |